(12) United States Patent (10) Patent No.: US 8,219,657 B2
Bhagwan et al. (45) Date of Patent: Jul. 10, 2012

(54) AUTOMATIC REQUEST CATEGORIZATION FOR INTERNET APPLICATIONS

(75) Inventors: Ranjita Bhagwan, Bangalore (IN); Monojit Choudhury, Bangalore (IN); Ravindran Kannan, Bangalore (IN); Venkata N. Padmanabhan, Bangalore (IN); Abhishek Sharma, Glendale, CA (US); Geoffrey Voelker, Del Mar, CA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 12/138,445

(22) Filed: Jun. 13, 2008

(65) Prior Publication Data

US 2009/0313282 A1 Dec. 17, 2009

(51) Int. Cl.
*G06F 15/173* (2006.01)
*G06F 15/16* (2006.01)

(52) U.S. Cl. ........ 709/223; 709/217; 709/224; 709/225; 709/226; 709/229

(58) Field of Classification Search .................. 709/220, 709/223–224, 226
See application file for complete search history.

(56) References Cited

U.S. PATENT DOCUMENTS

| | | | | |
|---|---|---|---|---|
| 5,835,905 | A * | 11/1998 | Pirolli et al. | ........................ 1/1 |
| 6,947,985 | B2 | 9/2005 | Hegli et al. | |
| 7,131,025 | B2 | 10/2006 | Tarcea et al. | |
| 7,321,926 | B1 | 1/2008 | Zhang et al. | |
| 7,324,543 | B2 | 1/2008 | Wassew et al. | |
| 2006/0104285 | A1 * | 5/2006 | Kamiya et al. | ............ 370/395.4 |
| 2006/0218278 | A1 * | 9/2006 | Uyama et al. | ................. 709/226 |
| 2007/0016907 | A1 | 1/2007 | Benedeti et al. | |
| 2007/0061464 | A1 | 3/2007 | Feng et al. | |
| 2007/0244750 | A1 * | 10/2007 | Grannan et al. | ................. 705/14 |
| 2007/0288929 | A1 | 12/2007 | Bassin et al. | |
| 2008/0016218 | A1 | 1/2008 | Jones et al. | |

OTHER PUBLICATIONS

Wang et al., "Characterizing Customer Groups for an Ecommerce Website", Copyright 2004 ACM 1581137110/04/0005, 10 pages.
Xu et al., "Regulating workload in J2EE Application Servers", 2006, 5 pages.
Devarakonda et al., "Policy-Based Multi-Datacenter Resource Management", Proceedings of the Sixth IEEE International Workshop on Policies for Distributed Systems and Networks (Policy'05) 2005 IEEE, 4 pages.
Aguilera et al., "Performance Debugging for Distributed Systems of Black Boxes", SOSP'03, Oct. 19-22, 2003, Bolton Landing, New York, USA. Copyright 2003 ACM 1-58113-757-5/03/0010, 16 pages.
"Module Index", http://httpd.apache.org/docs/2.0/mod/.
Bagchi et al., "Capacity Planning Tools for Web and Grid Environments", Copyright 2006 ACM 1-59593-504-5, 10 pages.
Barham et al., "Using Magpie for request extraction and workload modeiling", Dec. 2004, pp. 259-272.

(Continued)

*Primary Examiner* — Emmanuel L Moise
*Assistant Examiner* — Farzana Huq
(74) *Attorney, Agent, or Firm* — Lyon & Harr, LLP; Richard T. Lyon

(57) ABSTRACT

Application service requests received by an application hosting framework are automatically differentiated and categorized, and resource usage patterns associated with the requests are predicted. Resource usage data points are successively extracted from the hosting framework. Elements of an initial resource usage pattern matrix are computed from the data points. An estimate for the number of categories of requests is computed from the initial resource usage pattern matrix, where the requests in each category have similar resource usage patterns. Elements of a resource usage signature matrix and request categorization matrix are computed from the estimate for the number of categories of requests and the initial resource usage pattern matrix.

20 Claims, 6 Drawing Sheets

OTHER PUBLICATIONS

Bell et al., "An Information Maximization Approach to Blind Source Separation and Blind Deconvolution", Feb. 1995, pp. 1-38.

Cecchet et al., "Performance Comparison of Middleware Architectures for Generating Dynamic Web Content", 4th Middleware Conference, Rio de Janeiro, Brazil, Jun. 2003. 20 Pages.

Chen et al., "Path-Based Failure and Evolution Management", 2004, 14 pages.

Crovella et al., "Self-Similarity in World Wide Web Traffic: Evidence and Possible Causes", Appeared on IEEE/ACM Transactions on Networking, vol. 5, # 6,(1997), 6 pages.

Gmach et al., "Workload Analysis and Demand Prediction of Enterprise Data Center Applications", Proc. of the 2007 IEEE International Symposium on Workload Characterization (IISWC'2007), Sep. 2007, 10 pages.

"Welcome to the Httperf Homepage", 2008. http://www.hpl.hp.com/research/linux/httperf/.

Hyvarinen, Aapo , "Gaussian Moments for Noisy Independent Component Analysis", Feb. 19, 1999, pp. 1-14.

Kelly et al., "Predicting Performance in Distributed Enterprise Applications", May 4, 2006, 15 pages.

"Matlab", (Retrieved Jan. 31, 2008). http://www.mathworks.com/.

"Microsoft .NET Pet Shop 4.0", Microsoft Corporation, 2008. http://msdn2.microsoft.com/en-us/library/aa479071.aspx.

Reynolds et al., "Pip: Detecting the Unexpected in Distributed Systems", In Proc. 3rd Symp. on Networked Systems Design and Implementation (NSDI), San Jose, CA, May 2006, pp. 115-128.

"RUBiS: Rice University Bidding System", Mar. 24, 2004. http://rubis.objectweb.org/.

Slothouber et al., "A Model of Web Server Performance", 1995, 15 pages.

Stewart et al., "Exploiting Nonstationarity for Performance Prediction", Copyright 2007 ACM 9781, 14 Pages.

Stewart et al., "Performance Modeling and System Management for Multi-component Online Services", Appeared in Proc. of the Second USENIX Symposium on Networked Systems Design and Implementation (NSDI'05).14 Pages.

"LIBPCAP Public Repository", (Retrieved Jan. 31, 2008). http://www.tcpdump.org/.

"TeamQuest Model: Capacity Planning Software with Modeling", (Retrieved Jan. 31, 2008). http://www.teamquest.com/solutions-products/products/model/index.htm.

Urgaonkar et al., An Analytical Model for Multitier Internet Services and Its Applications, 2005, 13 pages.

Yeung et al., "On the Modeling of WWW Request Arrivals", 1999, 6 pages.

Zhang et al., "A Regression-Based Analytic Model for Dynamic Resource Provisioning of Multi-Tier Applications", Fourth International Conference on Autonomic Computing (ICAC'07) 0-7695-2779-5/07, 2007,10 pages.

Zhang et al., "A Regression-Based Analytic Model for Dynamic Resource Provisioning of Multi-Tier Applications", Jun. 16, 2007, 11 pages.

Chandalia, et al., "Blind Source Separation Approach to Performance Diagnosis and Dependency Discovery", IMC'07, Oct. 24-26, 2007, San Diego, California, USA. pp. 259-264.

Iyengar, et al., "Analysis and Characterization of Large-Scale Web Server Access Patterns and Performance", 1999. 30 Pages.

Sambasivan, et al., "Categorizing and differencing system behaviours", 2007. 5 Pages.

Stone, "Independent component analysis: an introduction", TRENDS in Cognitive Sciences vol. 6 No. 2 Feb. 2002. pp. 59-64.

* cited by examiner

AUTOMATIC REQUEST CATEGORIZATION FOR INTERNET APPLICATIONS

BACKGROUND

The Internet and the vast array of applications it offers have become a fundamental part of life for much of the world's population. The volume of Internet use and the number of different applications the Internet offers are ever growing as cost effective, reasonable bandwidth access to the Internet continues to grow, and as new applications and their corresponding supporting software components continue to be developed. The Internet consists of a massive distributed collection of different computing systems which operate as application servers and which are interconnected via various networks. A typical application operates across a plurality of computing systems and networks. A typical application also relies upon the operation of a plurality of software components, where each software component performs a particular task and the plurality of software components operates together to provide the application. Additionally, a particular software component for a typical application can be required to operate on a plurality of computing systems simultaneously in order to provide for fault tolerance, computing and network resource load balancing, or both.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Automatic request categorization (ARC) technique embodiments described herein generally provide for the automatic differentiation and categorization of application service requests (ASRs) received by an application hosting framework (AHF), and also provide for the prediction of AHF resource usage patterns associated with the ASRs. A prescribed number of resource usage data points can be successively extracted from the AHF. The elements of an initial AHF resource usage pattern matrix can then be computed from the data points. An estimate for the number of different categories of ASRs can then be computed from the initial AHF resource usage pattern matrix using a blind source separation (BSS) procedure, where the ASRs in each category have similar resource usage patterns. The elements of an AHF resource usage signature matrix and ASR categorization matrix can then be computed from the estimate for the number of different categories of ASRs and the initial AHF resource usage pattern matrix using the BSS procedure. In another exemplary embodiment the estimate for the number of different categories of ASRs, the AHF resource usage signature matrix and the ASR categorization matrix can be computed in an iterative manner for an increasing number of categories until either the number of categories equals the number of different types of resources in the AHF whose usage is measured, or the difference between the current iteration of the ASR categorization matrix and the immediately preceding iteration of this matrix is less than or equal to a prescribed degree.

The ARC technique embodiments described herein are generic and can be easily applied to a variety of different computing and network system frameworks which contain a mix of different categories of ASRs. In addition to this benefit, other advantages of the ARC technique embodiments described herein will become apparent from the detailed description which follows hereafter when taken in conjunction with the drawing figures which accompany the detailed description.

DESCRIPTION OF THE DRAWINGS

The specific features, aspects, and advantages of the automatic request categorization (ARC) technique embodiments described herein will become better understood with regard to the following description, appended claims, and accompanying drawings where:

DETAILED DESCRIPTION

Figure 1:
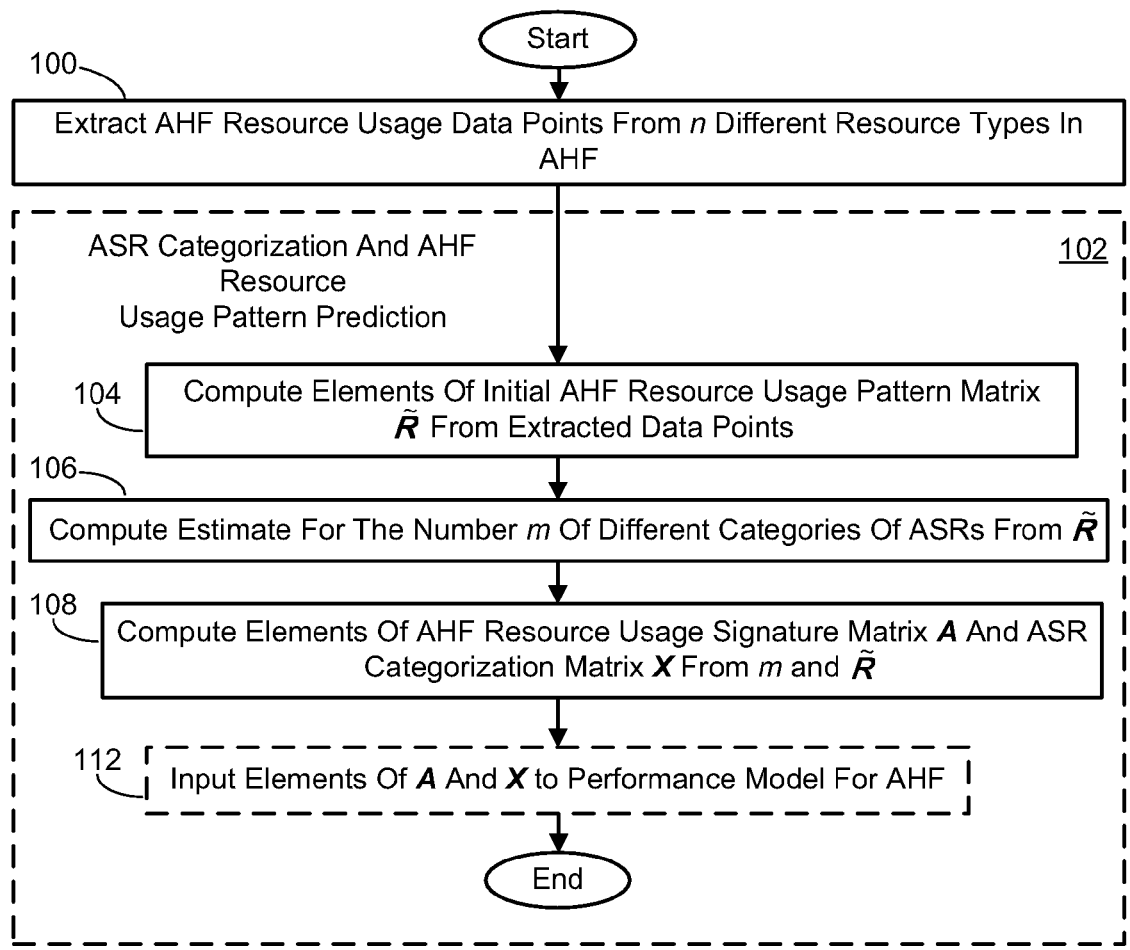
FIG. 1 illustrates a flow diagram of one embodiment, in simplified form, of a process for automatically differentiating and categorizing application service requests (ASRs) received by an application hosting framework (AHF) and predicting AHF resource usage patterns associated with the ASRs.

In the following description of automatic request categorization (ARC) technique embodiments reference is made to the accompanying drawings which form a part hereof, and in which are shown, by way of illustration, specific embodiments in which the ARC technique can be practiced. It is understood that other embodiments can be utilized and structural changes can be made without departing from the scope of the ARC technique embodiments. The term "resources" is used herein to refer to both computing system resources and network resources. The term "application hosting framework (AHF)" is used herein to refer to a collection of resources which host (i.e., provide for the operation of) one or more applications and their corresponding supporting software components. It should be noted that although the ARC technique embodiments are describe herein in relation to the Internet and the applications it offers, the ARC technique embodiments are also operational on private intranets which use the public Internet computing systems and networks to offer a select group of private applications to a restricted group of users, as well as on any other collection of computing systems and networks not associated with the Internet.

1.0 ARC for Internet Applications

Due to the aforementioned ever growing volume of Internet use and the number of different applications the Internet offers, Internet AHFs today can range from being based on a single computing system to being based on a complex data center. A typical data center today includes a number of distributed, network-interconnected computing systems which are often configured in a tiered, clustered manner. A typical AHF today hosts a plurality of applications such as E-mail, online chat, file sharing, file transfer, E-commerce, and providing access to the web sites and other information repositories of the World Wide Web, among others. These applications are often tiered. Thus, a typical AHF today contains a complex configuration of numerous resources and software components.

As is appreciated in the art of the Internet, Internet users generate requests from their client computing systems to use a specific service (i.e. a specific feature or specific functionality) in a specific application which is hosted on a specific AHF. These requests are hereafter referred to as "application service requests (ASRs)." Receipt of each ASR by the AHF generates a usage of resources in the AHF, where the resources are generally used by the plurality of software components which operate together to provide the requested application service to the requesting client. For a typical application, there are a variety of different types of ASRs associated with the application. Each type of ASR typically uses the AHF resources in a different manner. Thus, the resource usage in the AHF generally varies over time. Additionally, the different types of ASRs typically fall into different categories. By way of example, ASRs associated with an E-commerce application typically fall into categories such as browsing, shopping, login, and the like. On average, the shopping category of ASRs generally uses more central processing unit (CPU) resources in the AHF than the browsing category of ASRs. Over a period of time, a typical AHF will receive a number of ASRs from a number of different Internet users. The mix of categories for the ASRs received during a prescribed time interval at one point in time will generally be different than the mix of categories for the ASRs received during the same time interval at another point in time.

Generally speaking, the ARC technique embodiments described herein automatically differentiate and categorize ASRs received by an AHF, and then predict the AHF resource usage patterns associated with the ASRs by discovering ASR distribution trends in the categories of ASRs, given only high level, "coarse grain" aggregate resource usage data extracted from a prescribed number of different resources in the AHF. The ARC technique embodiments perform these operations without any prior knowledge of individual ASR types or their resource usage characteristics. The results of the ARC technique embodiments can be used to perform a variety of AHF resource administration tasks in order to be able to efficiently provision the AHF with the resources needed to enable the applications hosted therein to meet their performance goals in the face of regular changes in the volume of use. Exemplary resource administration tasks include resource usage profiling and resource provisioning. Regular performance of these tasks is also useful for forward looking AHF capacity planning (i.e., forecasting future AHF resource requirements based on anticipated changes in the volume of use of the applications currently being offered by the AHF and those which are planned to be offered in the near future).

FIG. 1 illustrates a flow diagram of one embodiment, in simplified form, of a process for automatically differentiating and categorizing ASRs received by an AHF and predicting AHF resource usage patterns associated with the ASRs. As exemplified in FIG. 1, the procedure generally includes a resource usage data extraction phase 100 followed by an ASR categorization and AHF resource usage pattern prediction phase 102. The operation of embodiments of both these phases is described in detail hereafter.

2.0 Extracting AHF Resource Usage Data

Referring again to FIG. 1, this section provides a more detailed description of exemplary embodiments of the resource usage data extraction phase 100 of the ARC technique. In this phase 100 a prescribed number T of resource usage data points are successively extracted from the AHF while it is operating in a typical user environment. Generally speaking, the larger the value of T, the more precise the computations of the ARC technique embodiments described herein will be. In tested embodiments of the ARC technique, a value of 150 or greater was used for T. Each data point includes an aggregate count of the number of ASRs received by the AHF during a prescribed duration time window. The term "aggregate" in this ASR count context is used herein to mean the sum of the number of ASRs received by each computing system in the AHF. For reasons which will be described in detail hereafter, in tested embodiments of the ARC technique, a ten minute time window was used. Each data point also includes an aggregate measurement of resource usage for each of a prescribed number n of different types of resources in the AHF during the same time window. These n different resource types can include a variety of high level resources in the AHF such as CPU resources, network bandwidth resources, and the like. In one tested embodiment of the ARC technique only CPU resources for two different software components were measured in the AHF (i.e., n=2). In another tested embodiment of the ARC technique both CPU resources for two different software components and network bandwidth resources between the same two software components were measured in the AHF (i.e., n=3). Other embodiments of the ARC technique are also possible where only CPU resources for more than two different software components are measured in the AHF, and where both CPU resources for more than two different software components and network bandwidth resources between the same more than two software components are measured in the AHF (i.e., n>3). Yet other embodiments of the ARC technique are also possible which employ an additional resource type(s), either in place of the CPU resources or network bandwidth resources, or in addition to the CPU resources and network bandwidth resources.

Thus, the ARC technique embodiments described herein are based on coarse grain, aggregate usage measurements of high level AHF resources. Such measurements of these types of resources can be easily extracted from the AHF using basic, conventional monitoring utilities such as system performance counters and logs which either already exist within, or can easily be added to, the computing systems and applications in the AHF. Thus, one does not have to deal with the challenges, risks, added expense and time associated with having to deploy a separate, sophisticated performance monitoring and logging instrumentation infrastructure within the AHF. In addition, a deep knowledge of the architecture of the various resources, applications and software components associated with the AHF is not generally required, as would be to deploy such a sophisticated instrumentation infrastructure.

3.0 ASR Categorization and AHF Resource Usage Pattern Prediction

Referring again to FIG. 1, this section provides a more detailed description of exemplary embodiments of the ASR categorization and AHF resource usage pattern prediction phase 102 of the ARC technique. Generally speaking, this phase 102 is based on a mathematical model (hereafter referred to as the "ARC model") and a corresponding multi-stage procedure for differentiating and categorizing the ASRs received by a particular AHF, and then predicting the AHF resource usage patterns associated with the ASRs. This multistage procedure generally operates as follows. In the first stage 104, the elements of an initial AHF resource usage pattern matrix $\tilde{R}$ can be computed from the prescribed number T of resource usage data points that were successively extracted from the AHF during the resource usage data extraction phase 100. Then, in the second stage 106 an estimate for the number m of different categories of ASRs can be computed from $\tilde{R}$. Then, in the third stage 108 the elements of an AHF resource usage signature matrix A and an ASR categorization matrix X can be computed from m and $\tilde{R}$. Then, in the final stage 112 the elements of A and X can optionally be input to a performance model for the AHF. Exemplary embodiments of the ARC model and this corresponding multistage procedure will now be described in detail.

3.1 ARC Model

This section provides a more detailed description of an exemplary embodiment of the aforementioned ARC model. It is noted that this model is based on a linearity assumption which dictates that the resource usage associated with a particular category of ASRs increases linearly with the number of ASRs received by the AHF. It is also noted that the ARC technique embodiments described herein are flexible in terms of the definition of exactly what constitutes an ASR. Accordingly, the ARC technique embodiments can differentiate and categorize ASRs based on a variety of criteria. By way of example but not limitation, in one tested embodiment of the ARC technique ASRs were differentiated and categorized based on their ASR type (e.g., HyperText Transfer Protocol (HTTP) GET versus HTTP POST versus HTTP PUT, etc.); in this case each of the aforementioned data points would included an aggregate count of the number of HTTP ASRs received by the AHF during the prescribed duration time window. In another tested embodiment of the ARC technique ASRs were differentiated and categorized at the session level (e.g., browsing versus shopping versus login, etc.); in this case each data point would included an aggregate count of the number of user sessions observed in the AHF during the prescribed duration time window. Other embodiments of the ARC technique are also possible in which ASRs are differentiated and categorized based on other types of criteria such as their content type (e.g., HyperText Markup Language (HTML) versus images versus scripts, etc.).

Referring again to FIG. 1, given the T resource usage data points that were successively extracted from the n different resource types in the AHF during the data extraction phase 100 described heretofore, the general goals of the ASR categorization and AHF resource usage pattern prediction phase 102 are to (a) automatically differentiate and categorize the ASRs represented in these data points such that the ASRs in each category of ASRs have similar resource usage patterns, and (b) then predict the AHF resource usage patterns associated with the ASRs by discovering ASR distribution trends in the categories of ASRs. Generally speaking, to accomplish this goal this phase 102 needs to determine the aforementioned number m of different categories of ASRs, the number of ASRs that fall into each category, and the resources used by the ASRs in each category.

The exemplary embodiment of the ARC model described herein assumes there are m different categories of ASRs given by $(RC_1, \ldots, RC_m)$. As described heretofore, the ASRs received by the AHF are categorized such that the ASRs in each category $RC_j$ have similar resource usage patterns. It is also assumed that there are n different resource types in the AHF whose usage is being measured given by $(RS_1, \ldots, RS_n)$. The linearity assumption described heretofore dictates that there is a positive mixing coefficient $a_{ij}$ such that the amount of a particular resource $RS_i$ required to process x total ASRs that fall into a particular category $RC_j$ can be given by the formula $a_{ij}x + c_{ij}$ where $c_{ij}$ is a prescribed constant. Assuming the AHF receives $x_j$ ASRs that fall into each category $RC_j$ during a particular time window, the aggregate amount of particular resource $RS_i$ required to process all the ASRs received by the AHF across all m categories of ASRs $RC_j$ during this particular time window can be given by the equation:

$$r_i = a_{i1}x_1 + a_{i2}x_2 + \ldots + a_{im}x_m + c_i, \qquad (1)$$

where $$c_i = \sum_{j=1}^{m} c_{ij}.$$

An AHF resource usage pattern vector r for a particular data point can be modeled as a set of linear equations via the following matrix-based equation:

$$r = Ax + c, \qquad (2)$$

where $$A = \begin{bmatrix} a_{11} & a_{12} & \ldots & a_{1m} \\ a_{21} & a_{22} & \cdots & a_{2m} \\ \vdots & \vdots & \vdots & \ddots \\ a_{n1} & a_{n2} & \ldots & a_{nm} \end{bmatrix}, x = \begin{bmatrix} x_1 \\ x_2 \\ \vdots \\ x_m \end{bmatrix}, c = \begin{bmatrix} c_1 \\ c_2 \\ \vdots \\ c_n \end{bmatrix} \text{ and } r = \begin{bmatrix} r_1 \\ r_2 \\ \vdots \\ r_n \end{bmatrix}.$$

A is an n×m resource usage signature matrix which contains the aforementioned mixing coefficients $a_{ij}$ for all the categories of ASRs, where the i-th column of A is a resource usage "signature" of ASR category $RC_i$. Column vector x is an ASR categorization vector whose elements $x_i$ are the aforementioned total number of ASRs received by the AHF that fall into each particular category $RC_i$ of ASRs during the time window associated with the particular data point. Column vector c is a prescribed constants vector whose elements $c_i$ are the aforementioned prescribed constants for each particular type of resource $r_i$ in the AHF whose usage is being measured.

The exemplary embodiment of the ARC model described herein further assumes that the total number of ASRs received by the AHF across all the different categories of ASRs (i.e.

$$\sum_{j=1}^{m} x_j$$

is known. However, rather than modeling this total as a separate equation, it is noted that this total can be represented within the framework of equation (2) under the condition where all the mixing coefficients $a_{ij}$ have a value equal to one and the prescribed constant $c_i$ has a value equal to zero. For the sake of consistency, it is yet further assumed that $RS_1$ models $$\sum_{j=1}^{m} x_j,$$

which corresponds to the condition where all the elements of the first row of A have a value of one and $c_1=0$.

It is noted that when a large number of different resource usage data points are extracted from the AHF over a long period of time (which as described herein is the case for tested embodiments of the ARC technique), the values of the elements of A and c remain fixed across all the data points (i.e., there is only one A and one c for all the data points). In contrast, the values of the elements of x and r vary for each data point (i.e., there can be a different x and r for each data point). Therefore, given the T different resource usage data points that were extracted from the n different resource types in the AHF, T different systems of linear equations can be given by the following equation:

$$R=AX+C, \quad (3)$$

X is an ASR categorization matrix given by the equation $X=[x^1, x^2, \ldots, x^T]$, where $x^t$ is the ASR categorization vector for the t-th data point. R is an AHF resource usage pattern matrix for all the data points given by the equation $R=[r^1, r^2, \ldots, r^T]$, where $r^t$ is the AHF resource usage pattern vector for the t-th data point. C is a prescribed constants matrix given by the equation $C=[c^1, c^2, \ldots, c^T]$, where $c^t$ is the prescribed constants vector for the t-th data point.

Although a strictly linear relationship is assumed between $x^t$ and $r^t$ as described heretofore, in reality there will be some deviations in this linear relationship. These deviations can be modeled as a zero-mean Gaussian noise. Since the sum of a plurality of zero-mean Gaussians is also a zero-mean Gaussian, equation (1) can be re-written as follows:

$$r_i = a_{i1}x_1 + a_{i2}x_2 + \ldots + a_{im}x_m + c_i + \epsilon, \quad (4)$$

where $\epsilon$ models the zero-mean Gaussian noise. It is noted that $c_i+\epsilon$ can also be employed as a model for the noise where $c_i$ is the mean and the variance is the same as that of $\epsilon$. Thus, under "noisy" conditions equation (3) can be re-written as:

$$R=AX+C_\epsilon, \quad (5)$$

where the value of the matrix element corresponding to the i-th row and j-th column of $C_\epsilon$ can be given by $c_i+\epsilon$. From a geometric standpoint equation (5) can be interpreted as stating that if each column of R is plotted as a point in an n-dimensional space, then the T resource usage data points corresponding to the T columns of R should (approximately) lie on an m-dimensional hyper-plane. This interpretation stems from the aforementioned linearity assumption. In tested embodiments of the ARC technique described herein, this interpretation was used to validate the linearity assumption. In summary, based on the aforementioned linearity assumption which dictates that the AHF resource usage associated with a particular category of ASRs increases linearly with the number of ASRs received by the AHF, equation (5) provides an exemplary embodiment of a mathematical model for differentiating and categorizing ASRs received by the AHF, and then predicting the AHF resource usage patterns associated with the ASRs.

3.2 Computing Matrix $\tilde{R}$

Referring again to FIG. 1, once the resource usage data extraction phase 100 has been completed and the prescribed number T of resource usage data points have been successively extracted from the AHF, the elements of an initial AHF resource usage pattern matrix $\tilde{R}$ can be computed from these data points 104. However, it should be noted that in the event that the AHF becomes overloaded with ASRs at certain times, then the data points extracted from the AHF during these overload times could be corrupted due to the fact that certain resource types in the AHF could be overloaded during these times. Such a corrupted data point can be identified based on the following criteria. It will either contain (a) an aggregate ASR count which is anomalously high in comparison to the other data points, (b) an aggregate AHF resource usage measurement for one or more of the n different types of resources which is anomalously high in comparison to the other data points, or both (a) and (b). In other words, if a t-th data point is corrupted one or more of the element values in $r^t$ will be anomalously high in comparison to the other data points. The presence of corrupted data points in $\tilde{R}$ will negatively affect the precision of the ARC technique embodiments described herein. Thus, in an optional embodiment of the first stage 104, any such corrupted data points can be identified and removed from $\tilde{R}$, thus insuring that the subsequent stages 106/108/112 of the ARC technique operate only on data points extracted from the AHF when it is not overloaded.

Figure 4:
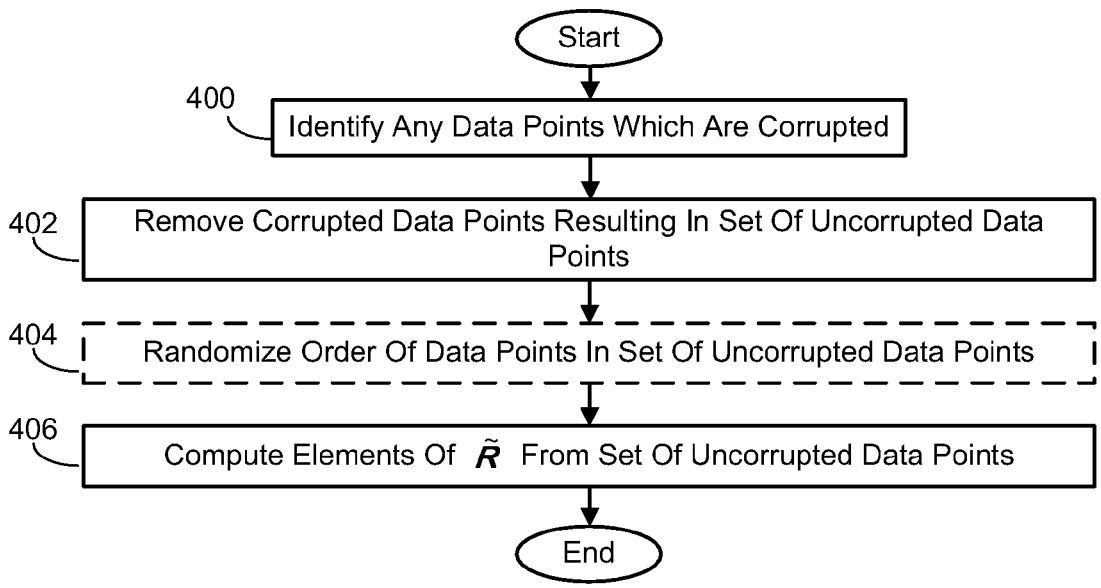
FIG. 4 illustrates a flow diagram of an exemplary embodiment of a process for identifying and removing any corrupted AHF resource usage data points from an initial AHF resource usage pattern matrix.

FIG. 4 illustrates a flow diagram of an exemplary embodiment of a process for identifying and removing any corrupted AHF resource usage data points from $\tilde{R}$. As exemplified in FIG. 4, the process starts with identifying any AHF resource usage data points which are corrupted based on the aforementioned criteria 400. The corrupted data points (if any) can then be removed, resulting in a set of uncorrupted data points 402. The elements of $\tilde{R}$ can then be computed from the set of uncorrupted data points 406.

3.3 Computing m, Matrix A and Matrix X

Referring again to FIG. 1, this section provides a more detailed description of exemplary embodiments of the second stage 106 and third stage 108 of the ASR categorization and AHF resource usage pattern prediction phase 102 of the ARC technique. Based on the ARC model described heretofore, the matrix $\tilde{R}$ that was computed in the first stage 104 can be given by the equation $\tilde{R}=[\tilde{r}^1, \tilde{r}^2, \ldots, \tilde{r}^T]$ where $\tilde{r}^t$ is the measured AHF resource usage pattern for the t-th time window. As described heretofore, $\tilde{r}^t$ contains a linear mixing of m categories of ASRs which are independent of each other.

Generally speaking and referring again to FIG. 1, the second stage 106 computes an estimate for the number m of different categories of ASRs received by the AHF from $\tilde{R}$. The third stage 108 computes values for the mixing coefficients $a_{ij}$ (i.e., the elements of A) and a categorization of the ASRs received by the AHF (i.e. the elements of X) from m and the T resource usage data points that were extracted from the n resource types in the AHF (i.e. the elements of $\tilde{R}$). As will be described in more detail hereafter, in an exemplary embodiment of the ARC technique a conventional singular value decomposition (SVD) method can be employed for the computation of the estimate of m and a conventional blind source separation (BSS) machine learning-based computational procedure can be employed for the computation of the elements of A and the elements of X.

As is appreciated in the art of BSS, the BSS procedure generally employs a gradient-based optimization method which maximizes the joint entropy of the categories $x_i$ of ASRs. It is noted that this joint entropy is at its maximum when the various $x_i$ are independent of each other. The BSS procedure is advantageous for a number of reasons, including but not limited to the following. The BSS procedure greatly simplifies the task of resource profiling when modeling applications employing ASRs that fall into a plurality of different categories. The BSS procedure can also profile resource usage at different granularities of resource types and categories of ASRs.

A variety of learning algorithms can be employed to perform the BSS procedure. In tested embodiments of the ARC technique which are described in detail hereafter, a conventional fast independent component analysis (FastICA) learning algorithm was employed to perform the BSS procedure. Examples of other suitable learning algorithms which can be employed to perform the BSS procedure include a conventional non-negative matrix factorization algorithm, a conventional non-negative independent component analysis algorithm, a correlated component analysis algorithm, and the like.

3.3.1 ICA Algorithm

As will be described in more detail hereafter and referring again to FIG. 1, assuming the following two conditions are met, a conventional singular value decomposition (SVD) method can be used to compute an estimate for the number m of different categories of ASRs received by the AHF from $\tilde{R}$ 106. Then, the FastICA algorithm can be used to compute the elements of A and X from m and $\tilde{R}$ 108 by solving the matrix factorization mathematical problem given by equation (5).

The first condition is that the different categories of ASRs should be independent of each other. In other words, the number of ASRs received by the AHF that fall into category $RC_i$ should be independent of the number of ASRs received by the AHF that fall into category $RC_j$. Stated differently, the elements of each column of X should be generated independently from the elements of the other columns. It is noted that independence generally implies a lack of correlation, but the reverse is not necessarily true. Therefore, the first condition is more stringent than there having to be a lack of correlation between the elements of each column of X. The second condition is that the distribution of the columns of X should be non-Gaussian. Referring again to FIG. 1, these two conditions can be met by employing appropriate techniques during the resource usage data extraction phase 100 and the first stage 104 of the ASR categorization and AHF resource usage pattern prediction phase 102. Exemplary embodiments of these appropriate data extraction techniques will now be described.

Regarding the second condition, as is appreciated in the art of the Internet, the distribution of the number of ASRs received by the AHF over time generally follows a bursty pattern. As described heretofore and referring again to FIG. 1, each AHF resource usage data point 100 includes an aggregate count of the number of ASRs received by the AHF during a prescribed duration time window, and aggregate measurements of AHF resource usage for a prescribed number n of different resource types in the AHF during the same time window. If the duration of this time window is reasonably long, the bursty pattern of ASR distribution over time should disappear and the ASR distribution should follow a Poisson-like pattern, which is essentially Gaussian in nature. On the other hand, if the duration of the time window is sufficiently small, due to the bursty nature of ASR distribution over time the number of ASRs received by the AHF should be uniformly distributed over a long period of time (such as 24 hours). Thus, the second condition can be met by employing uniform length time windows whose duration is sufficiently small. In tested embodiments of the ARC technique, ten minute duration time windows were employed.

Regarding the first condition, from a theoretical standpoint, if the duration of the time window is sufficiently small as described heretofore, the number of ASRs received by the AHF that fall into a particular category should be independent of the number of ASRs received by the AHF that fall into the other categories due to the aforementioned bursty nature of ASR distribution over time. On the other hand, from a practical standpoint, while most of the categories of ASRs should be independent of each other, there could be some correlation between particular categories of ASRs for certain types of applications. By way of example but not limitation, given the aforementioned E-commerce application with ASRs that fall into categories such as browsing, shopping, login and the like, it would be much more probable for the AHF to receive an ASR falling into the shopping category after having received a few ASRs falling into the browsing category. However, it is noted that this is a temporal correlation between particular categories of ASRs. Referring again to FIG. 4, in an exemplary embodiment of the ARC technique any temporal correlation that exists between categories of ASRs can optionally be removed from $\tilde{R}$ by randomizing the order of the AHF resource usage data points 404 before the elements of $\tilde{R}$ are computed 406.

By way of further example, correlation between particular categories of ASRs can also arise when a particular user activity results in a group of ASRs being sent to the AHF. By way of example but not limitation, if a particular web page hosted contains a plurality of HTML files and a plurality of Joint Photographic Experts Group (JPEG) image files, when a user clicks on a link to this particular web page a group of ASRs will be sent to the AHF that hosts the web page, where some of the ASRs in the group will request the HTML files and some will request the JPEG image files. Referring again to FIG. 1, if this sort of user activity-based correlation is dominant in the AHF resource usage data points 100, then the FastICA algorithm will place the group of ASRs into a new category during the third stage 108 of the ASR categorization and AHF resource usage pattern prediction phase 102. In other words, rather than placing the ASRs that request the HTML files into the aforementioned HTML category and placing the ASRs that request the JPEG files into the aforementioned images category, the FastICA algorithm will create a new category of ASRs that contains all the ASRs which access the particular web page. In the situation where the ASRs received by the AHF access a plurality of different web pages in the AHF and each web page has a different number of JPEG image files, the AHF resource usage data points will show no correlation between the ASRs which request the HTML files and those which request the JPEG image files. In either situation however, the categorization performed by the FastICA algorithm is considered to be correct.

Generally speaking, the FastICA algorithm can compute an infinite number of solutions to a particular mathematical problem when the problem is highly underspecified. It is noted that the mathematical model given by equation (5) for categorizing ASRs received by a particular AHF is indeed highly underspecified. Thus, assuming the FastICA algorithm computes a particular set of values for A and X, these values are not unique. Given an m×m unitary orthogonal matrix Z where $ZZ^T=1$, if AX=R then so does A'X'=R, where A'=AZ and $X'=Z^TX$. These $m^2$ degrees of freedom, which correspond to the $m^2$ elements of Z, manifest as the m independent sets of mixing coefficients $a_{ij}$ in the m columns of A. These $m^2$ degrees of freedom also manifest as permutations between the columns of A, where these permutations are essentially a renaming of the categories of ASRs. Therefore, A is only unique up to the scaling of its columns and their permutations. Therefore, as will be described in more detail hereafter, a unique solution for A can be pinned down using the first row of A.

It is noted that in order to operate properly, the FastICA algorithm requires the specification of a prior distribution and a convergence criteria (i.e., a total tolerable error). In tested embodiments of the ARC technique described herein a total tolerable error of $10^{-10}$ was specified for the Fast ICA algorithm. Regarding the prior distribution, in tested embodiments of the ARC technique it was observed that the specification of prior distribution had no tangible effect on the precision of the computations of the ARC technique.

3.3.2 Determining Categories of ASRs

Referring again to FIG. 1, this section provides a more detailed description of an exemplary embodiment of the second stage 106 of the ASR categorization and AHF resource usage pattern prediction phase 102 of the ARC technique. As described heretofore, the second stage 106 computes an estimate for the number m of different categories of ASRs received by the AHF from the T resource usage data points that were extracted from the n resource types in the AHF (i.e. the elements of $\tilde{R}$). For the following reasons, this computation can be performed by determining the rank of $\tilde{R}$. Given the n different resource types in the AHF whose usage was measured 100, and assuming there are m different categories of ASRs where n≧m, then the vectors $\tilde{r}'$ in $\tilde{R}$ will lie on an m-dimensional hyper-plane in an n-dimensional space. This implies that all the data points in $\tilde{r}'$ can be expressed as a linear combination of the m different $\tilde{r}'$ vectors. Therefore, the rank of $\tilde{R}$ is m where m≦n. The assumption that there are m different categories of ASRs where n≧m is valid because the number of different categories of ASRs that are created is controlled by the ARC technique described herein. In other words, if a situation existed where the number m of categories of ASRs could be greater than n, based upon the ARC model described heretofore the FastICA algorithm would combine particular categories of ASRs together until m=n. While this combining of categories of ASRs is not ideal, it still allows for a more precise differentiation of resource usage than if all the ASRs were simply combined into a single category.

Figure 2:
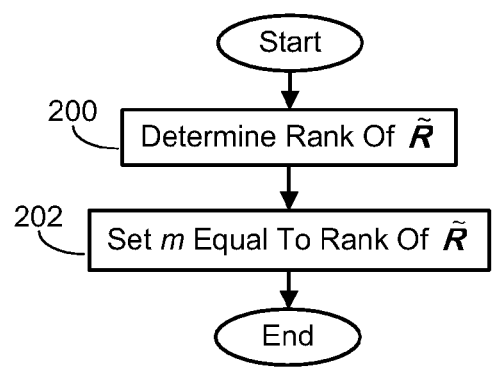
FIG. 2 illustrates a flow diagram of an exemplary embodiment of a process for computing an estimate for the number of different categories of ASRs.

FIG. 2 illustrates a flow diagram of an exemplary embodiment of a process for computing an estimate for the number m of different categories of ASRs from $\tilde{R}$. As exemplified in FIG. 2, the process starts with determining the rank of $\tilde{R}$ 200. The value of m is then set to the rank of $\tilde{R}$ 202. Generally speaking, the rank of a matrix can be determined using a variety of different techniques. In an exemplary embodiment of the ARC technique, the rank of R (and hence the value of m) can be determined by using the aforementioned SVD method.

3.3.3 Computing Elements of Matrix A and Matrix X

Referring again to FIG. 1, this section provides a more detailed description of an exemplary embodiment of the third stage 108 of the ASR categorization and AHF resource usage pattern prediction phase 102 of the ARC technique. Generally speaking, the third stage 108 computes values for the mixing coefficients $a_{ij}$ (i.e., the elements of A) and a categorization of the ASRs received by the AHF (i.e. the elements of X) from m and $\tilde{R}$. As described heretofore in the detailed description of the ARC model, the first row of A models the total number of ASRs received by the AHF across all the different categories of ASRs (i.e.

$$\sum_{j=1}^{m} x_j).$$

Therefore, the values of $a_{1j}$ for all j should be equal to one. As also described heretofore, there is only one A for all the data points. As a result, the mixing coefficients $a_{ij}$ can be computed in the following simple manner.

Figure 3:
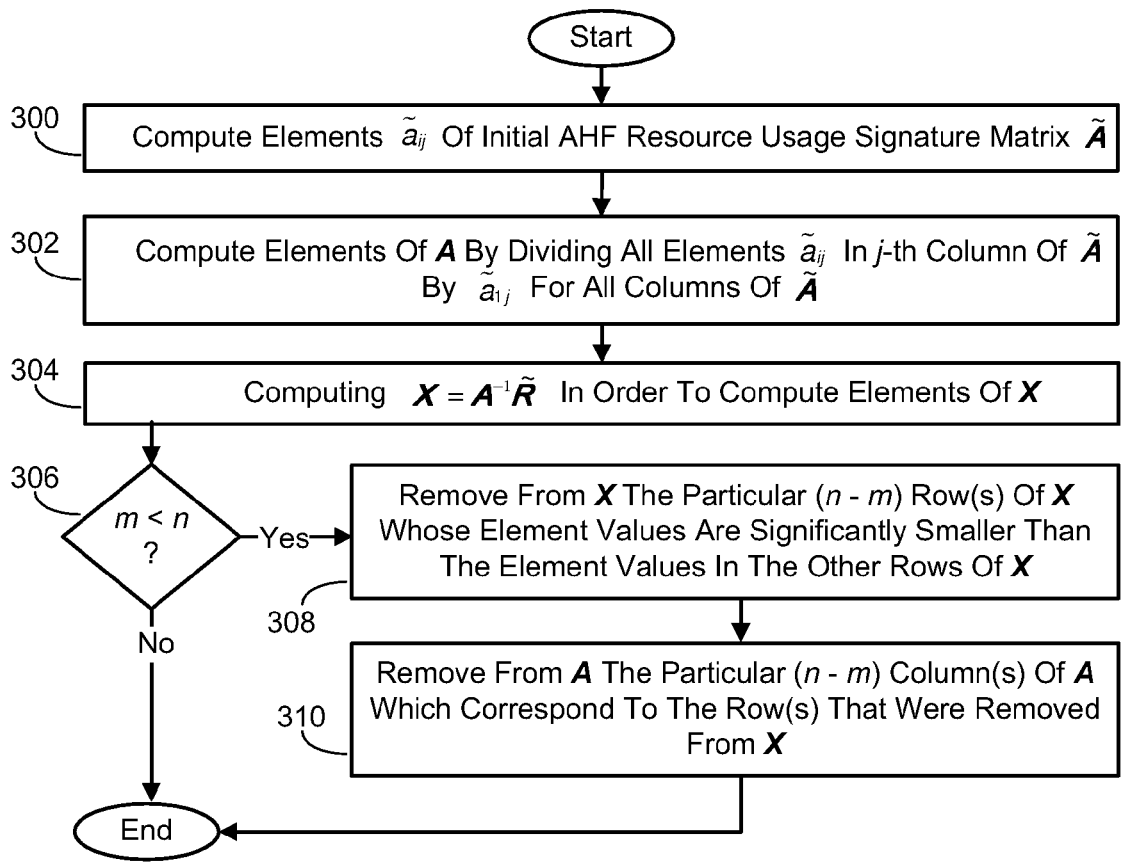
FIG. 3 illustrates a flow diagram of an exemplary embodiment of a process for computing the elements of an AHF resource usage signature matrix and an ASR categorization matrix.

FIG. 3 illustrates a flow diagram of an exemplary embodiment of a process for computing the elements of the AHF resource usage signature matrix A and the ASR categorization matrix X from m and $\tilde{R}$. As exemplified in FIG. 3, the process starts with using the FastICA algorithm to compute the elements $\tilde{a}_{ij}$ of an initial AHF resource usage signature matrix $\tilde{A}$ 300. All the elements $\tilde{a}_{ij}$ in the j-th column of $\tilde{A}$ are then divided by element $\tilde{a}_{1j}$ for all the columns of $\tilde{A}$ in order to compute the elements of A 302. Thus, by way of example but not limitation, if $$\tilde{A} = \begin{bmatrix} -1 & 2 \\ -2 & 6 \end{bmatrix},$$

then $$A = \begin{bmatrix} 1 & 1 \\ 2 & 3 \end{bmatrix}$$

after completing process action 302. Although A is unique only up to permutations of its columns as described heretofore, it is noted that each different permutation of its columns corresponds to a different naming of the categories of ASRs. Since the ARC technique embodiments described herein do not start with pre-determined categories of ASRs, there is no such thing as a singularly "correct" permutation of the columns of A. Thus, the elements of A can be computed in the manner just described.

It is assumed in the remainder of this section that A is invertible (i.e. $A^{-1}$). Generally speaking, this assumption requires m=n and non-singularity of A. However, it is noted that A is invertible even when n>m assuming the rank of A is m. Referring again to FIG. 1, this assumption is valid by virtue of the detailed description provided heretofore of the second stage 106 of the ASR categorization and AHF resource usage pattern prediction phase 102 of the ARC technique.

Generally speaking and referring again to FIG. 3, once the elements of A have been computed 302, a conventional linear equation solver can be used to compute the elements of X by solving for X in equation (5) 304. However, the presence of the aforementioned zero-mean Gaussian noise ε and the pre-scribed constants $c_{ij}$ in $C_ε$ first need to be addressed. It is noted that the FastICA algorithm works well in environments containing Gaussian noise, especially zero-mean Gaussian noise. Assuming the values of all the prescribed constants $c_{ij}$ in C are zero, then the FastICA algorithm can be used to compute the elements of X 304 by computing the following equation:

$$X = A^{-1}\tilde{R}. \tag{6}$$

This provides a fairly precise estimate for the elements of X which is off by only the noise ε.

The assumption that the values of all the constants $c_{ij}$ are zero is valid for the following reasons. First, in tested embodiments of the ARC technique it was observed that all the constants $c_{ij}$ were indeed very close to zero. Additionally, it will now be shown why it is not even necessary to know the values of $C_{ij}$. A test matrix Y can be defined by the equation $Y=A^{-1}\tilde{R}$. Based on equation (5), this equation for Y can be rewritten as follows:

$$Y=A^{-1}AX+A^{-1}C_\epsilon=X+D, \quad (7)$$

where D is a matrix of new prescribed constants. It is noted that the noise $\epsilon$ is neglected in Y. It is also noted that the values of the elements of Y differ from the values of the elements of X by a constant term. Since the overall goal of the ARC technique embodiments described herein is to precisely predict the AHF resource usage patterns associated with the ASRs by discovering ASR distribution trends in the categories of ASRs, the ASR distribution trends in Y can be predicted from equation (7). Given a sufficiently large number of data points, the effect of D in equation (7) can be nullified. In other words, if a conventional time series analysis method is used to generate a matrix of predictions Y' for Y, then a corresponding matrix of predictions X' for X can be given by the equation X'=Y'−D. Therefore, a predicted AHF resource usage pattern matrix R' can be given by the following equation:

$$R'=AY'=AX'+AD=AX'+C. \quad (8)$$

Thus, the values of the elements of R' are independent of the choice of the values of the elements of C assuming that the constant part of the trend can be separated out from the variable part of the trend, which in tested embodiments of the ARC technique proved to be a valid assumption.

Referring again to FIG. 3, once the elements of X have been computed 304, if m is less than n 306, the following two actions can be performed. First, the particular (n−m) row(s) of X whose element values are significantly smaller than the element values in the other rows of X are removed from X 308. It is noted that some of the elements values in the removed row(s) of X could even be negative. This process step 308 results in X having m rows which correspond to m valid categories of ASRs. Then, the particular (n−m) column(s) of A which correspond to the row(s) that were removed from X are removed from A 310.

4.0 Inputting Matrix A and Matrix X to Performance Model

Referring again to FIG. 1, once the AHF resource usage signature matrix A and the ASR categorization matrix X have been computed 108, in an exemplary embodiment of the ARC technique the elements of A and X can optionally be input to a performance model for the AHF 112. The performance model can then be used as a tool to facilitate carrying out the aforementioned variety of AHF resource administration tasks. It is noted that other embodiments of the ARC technique are possible in which the data contained in A and X is used for a variety of other computing system and network analysis purposes. It is also noted that the ARC technique embodiments described herein are performance model independent. As such, the data contained in A and X can be input to a variety of different types of performance models.

5.0 Additional Embodiments

While the ARC technique has been described in detail by specific reference to embodiments thereof, it is understood that variations and modifications thereof can be made without departing from the true spirit and scope of the ARC technique.

Figure 5A:
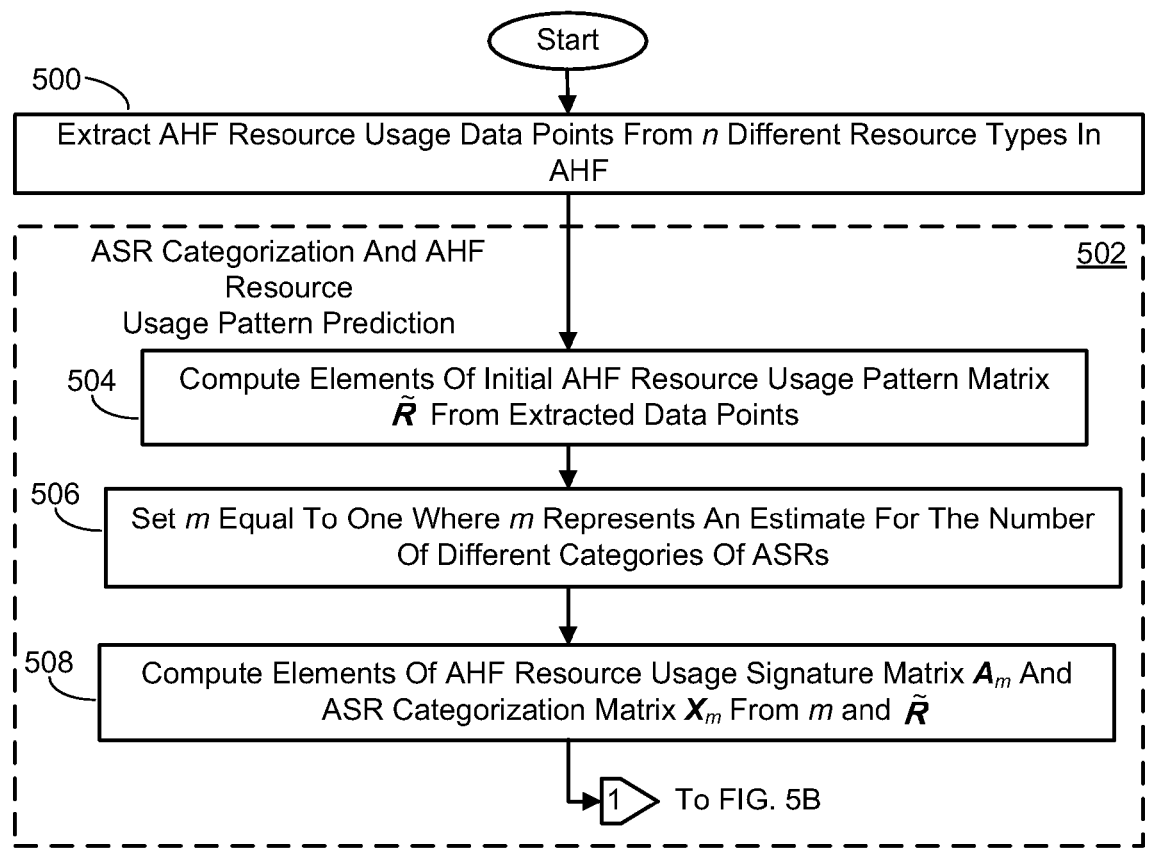
FIGS. 5A and 5B illustrate a flow diagram of an alternate embodiment, in simplified form, of a process for automatically differentiating and categorizing ASRs received by an AHF and predicting AHF resource usage patterns associated with the ASRs.
Figure 5B:
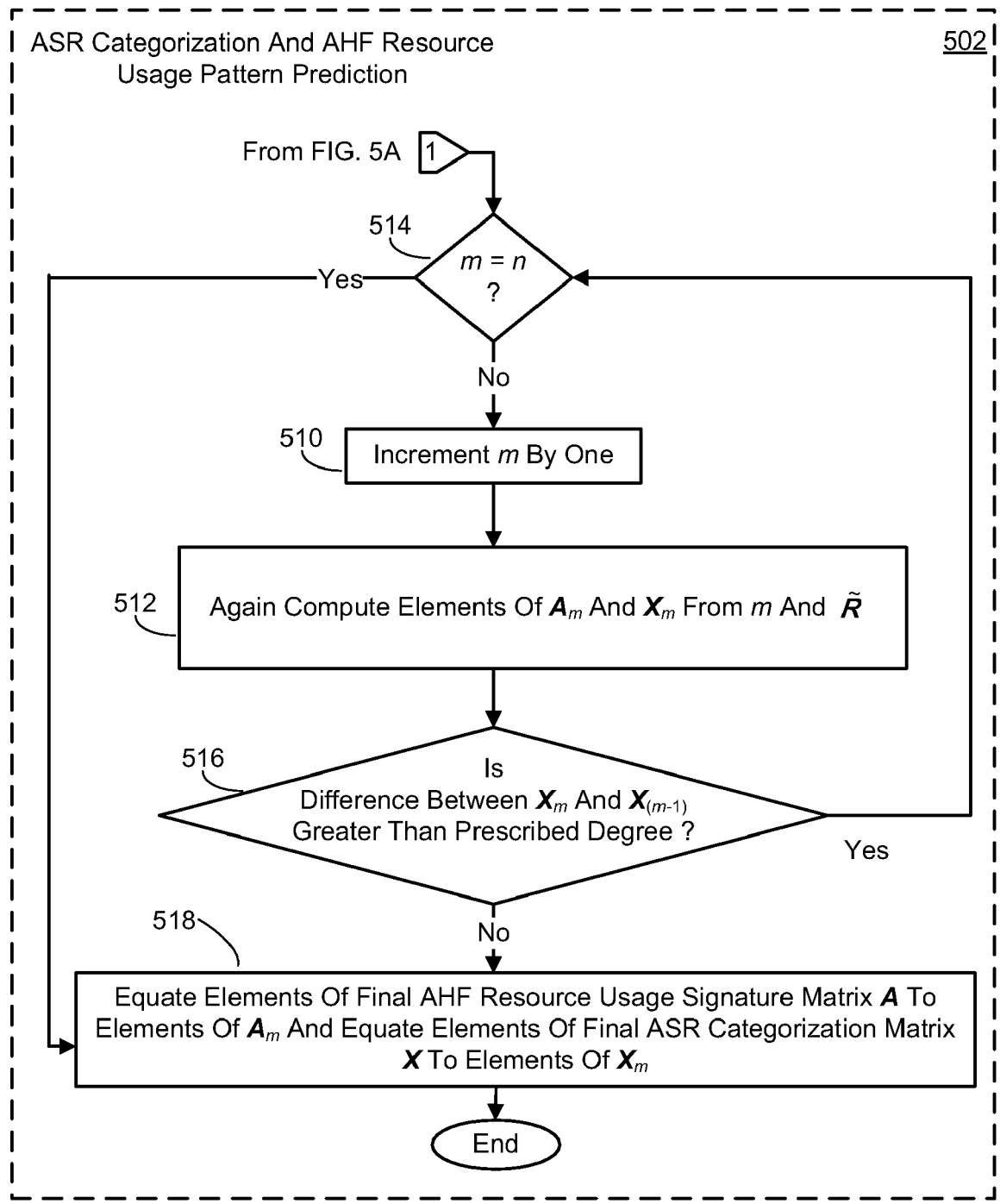

By way of example but not limitation, FIGS. 5A and 5B illustrate a diagram of an alternate embodiment, in simplified form, of a high level procedure for the ARC technique. Generally speaking, this alternate embodiment employs a technique for computing an estimate for the number m of different categories of ASRs received by the AHF which differs from the technique described heretofore (i.e., FIG. 2). As exemplified in FIGS. 5A and 5B and referring again to FIG. 1, the procedure generally includes a resource usage data extraction phase 500 followed by an ASR categorization and AHF resource usage pattern prediction phase 502. The data extraction phase 500 operates in the same manner as the data extraction phase 100 described heretofore. The categorization and prediction phase 502 is based on the ARC model described heretofore and a corresponding process for differentiating and categorizing the ASRs received by a particular AHF, and then predicting the AHF resource usage patterns associated with the ASRs. This process is hereafter referred to as the categorization and prediction process, a more detailed description of which will now be provided.

Referring again to FIGS. 1 and 5A, the first step 504 of the categorization and prediction process operates in the same manner as stage 104 described heretofore. Once the first step 504 has been completed and the elements of the initial AHF resource usage pattern matrix $\tilde{R}$ have been computed, a variable m can be set equal to one, where m represents an estimate for the number of different categories of ASRs 506. Then, the elements of an AHF resource usage signature matrix $A_m$ and an ASR categorization matrix $X_m$ can be computed from m and $\tilde{R}$ 508. It is noted that these computations of $A_m$ and $X_m$ 508 operate in the same manner as the third stage 108 described heretofore.

Referring again to FIGS. 1 and 5B, once the elements of $A_m$ and $X_m$ have been computed 508, if m equals n (where n represents the prescribed number of different types of resources in the AHF whose usage is measured as described heretofore) 514, then the elements of a final AHF resource usage signature matrix A can be equated to the elements of $A_m$ and the elements of a final ASR categorization matrix X can be equated to the elements of $X_m$ 518. If m does not equal n (i.e. m is still less than n) 514, then m is incremented by one 510 and the elements of $A_m$ and $X_m$ can again be computed from m and $\tilde{R}$ 512. It is noted that these computations of $A_m$ and $X_m$ 512 operate in the same manner as the third stage 108 described heretofore. If the difference between $X_m$ and $X_{(m-1)}$ is greater than a prescribed degree 516, and if m does not equal n (i.e. m is still less than n) 514, then steps 510 and 512 can be repeated until either m equals n 514, or the different between $X_m$ and $X_{(m-1)}$ is not greater than the prescribed degree 516, at which point the elements of A can be equated to the elements of $A_m$ and the elements of X can be equated to the elements of $X_m$ 518 as described heretofore. The comparison between $X_m$ and $X_{(m-1)}$ can be performed in a variety of different ways. In an exemplary embodiment, the root mean square (RMS) difference between every element in $X_m$ and its corresponding element in $X_{(m-1)}$ can be divided by m, resulting in a difference indicator value.

Figure 7:
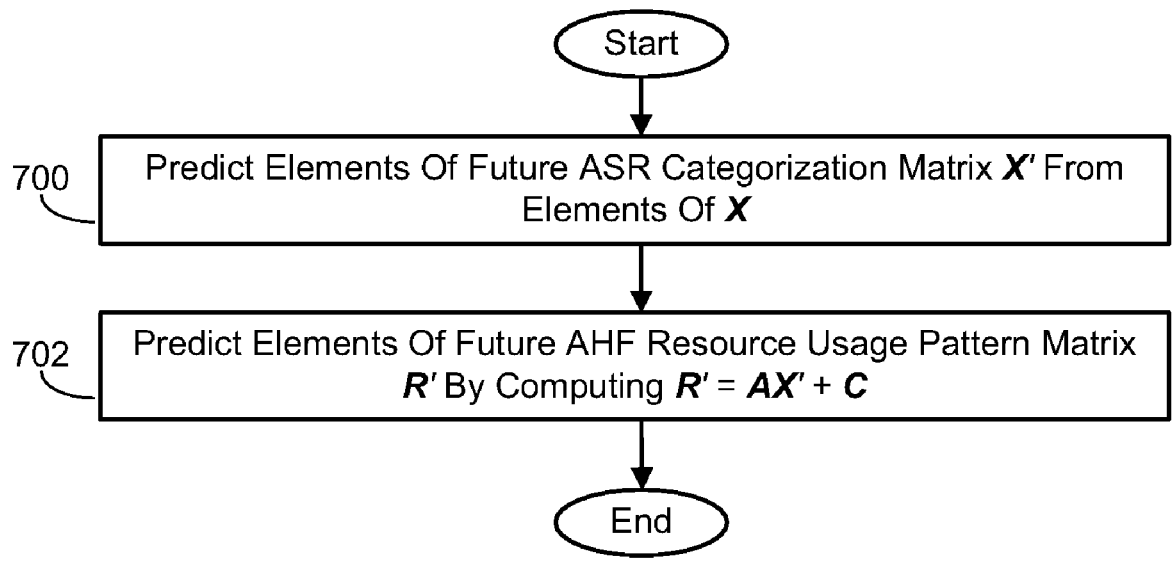
FIG. 7 illustrates a flow diagram of an exemplary embodiment of a process for predicting the elements of a future AHF resource usage pattern matrix.

FIG. 7 illustrates a flow diagram of an exemplary embodiment of a process for predicting the elements of a future AHF resource usage pattern matrix R' from A and X. As exemplified in FIG. 7, the process starts with predicting the elements of a future ASR categorization matrix X' from the elements of X 700 using a conventional time-series analysis method. The elements of R' can then be predicted by computing equation (8) 702. Similar to process action 112 described heretofore, the elements of R' can optionally be input to a performance model for the AHF (not shown).

It is noted that any or all of the ARC technique embodiments described herein can be used in any combination desired to form additional hybrid embodiments. Although the ARC technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

6.0 Computing Environment

This section provides a brief, general description of a suitable computing system environment in which portions of the ARC technique embodiments described herein can be implemented. These ARC technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 6:
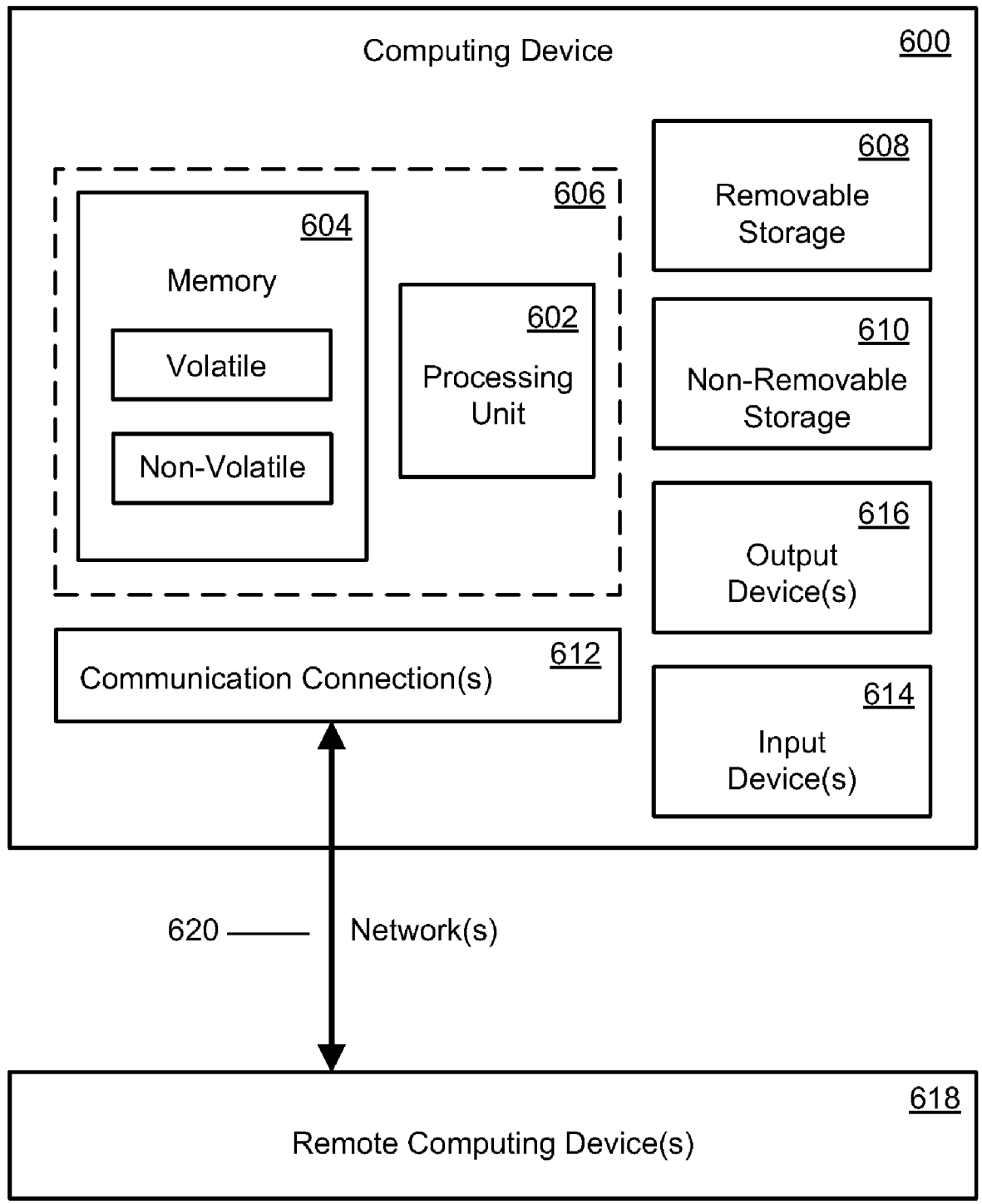
FIG. 6 illustrates a diagram of an exemplary embodiment, in simplified form, of a general purpose, network-based computing device which constitutes an exemplary system for implementing the ARC technique embodiments described herein.

FIG. 6 illustrates a diagram of an exemplary embodiment, in simplified form, of a suitable computing system environment according to the ARC technique embodiments described herein. The environment illustrated in FIG. 6 is only one example of a suitable computing system environment and is not intended to suggest any limitation as to the scope of use or functionality of the ARC technique embodiments described herein. Neither should the computing system environment be interpreted as having any dependency or requirement relating to any one or combination of components exemplified in FIG. 6.

As exemplified in FIG. 6, an exemplary system for implementing the ARC technique embodiments described herein includes one or more computing devices, such as computing device 600. In its simplest configuration, computing device 600 typically includes at least one processing unit 602 and memory 604. Depending on the specific configuration and type of computing device, the memory 604 can be volatile (such as RAM), non-volatile (such as ROM and flash memory, among others) or some combination of the two. This simplest configuration is illustrated by dashed line 606.

As exemplified in FIG. 6, computing device 600 can also have additional features and functionality. By way of example, computing device 600 can include additional storage such as removable storage 608 and/or non-removable storage 610. This additional storage includes, but is not limited to, magnetic disks, optical disks and tape. Computer storage media typically embodies volatile and non-volatile media, as well as removable and non-removable media implemented in any method or technology. The computer storage media provides for storage of various information required to operate the device 600 such as computer readable instructions associated with an operating system, application programs and other program modules, and data structures, among other things. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 600. Any such computer storage media can be part of computing device 600.

As exemplified in FIG. 6, computing device 600 also includes a communications connection(s) 612 that allows the device to operate in a networked environment and communicate with a remote computing device(s), such as remote computing device(s) 618. Remote computing device(s) 618 can be a PC, a server, a router, a peer device, or other common network node, and typically includes many or all of the elements described herein relative to computing device 600. Communication between computing devices takes place over a network(s) 620, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 612 and related network(s) 620 described herein are exemplary and other means of establishing communication between the computing devices can be used.

As exemplified in FIG. 6, communications connection(s) 612 and related network(s) 620 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 6, computing device 600 also includes an input device(s) 614 and output device(s) 616. Exemplary input devices 614 include, but are not limited to, a keyboard, mouse, pen, touch input device, microphone, and camera, among others. A user can enter commands and various types of information into the computing device 600 through the input device(s) 614. Exemplary output devices 616 include, but are not limited to, a display device(s), a printer, and audio output devices, among others. These input and output devices are well known and need not be described at length here.

Referring again to FIG. 6, the ARC technique embodiments described herein can be further described in the general context of computer-executable instructions, such as program modules, which are executed by computing device 600. Generally, program modules include routines, programs, objects, components, and data structures, among other things, that perform particular tasks or implement particular abstract data types. The ARC technique embodiments can also be practiced in a distributed computing environment where tasks are performed by one or more remote computing devices 618 that are linked through a communications network 612/620. In a distributed computing environment, program modules can be located in both local and remote computer storage media including, but not limited to, memory 604 and storage devices 608/610.

Wherefore, what is claimed is:

1. A computer-implemented process for automatically differentiating and categorizing application service requests (ASRs) received by an application hosting framework (AHF) and predicting AHF resource usage patterns associated with the ASRs, comprising:
using a computing device to perform the following process actions:
successively extracting a prescribed number T of resource usage data points from the AHF;
computing the elements of an initial AHF resource usage pattern matrix $\tilde{R}$ from the data points;
computing an estimate for the number m of different categories of ASRs from $\tilde{R}$, wherein the ASRs in each category have similar resource usage patterns; and
computing the elements of an AHF resource usage signature matrix A and an ASR categorization matrix X from m and $\tilde{R}$ using a blind source separation (BSS) procedure.

2. The process of claim 1, wherein the prescribed number T is greater than or equal to 150.

3. The process of claim 1, wherein each resource usage data point comprises:
an aggregate count of the number of ASRs received by the AHF during a prescribed duration time window; and
an aggregate measurement of AHF resource usage for each of a prescribed number n of different types of resources in the AHF during the time window.

4. The process of claim 3, wherein the duration of the time window is ten minutes.

5. The process of claim 3, wherein the different types of resources are central processing unit resources for two different software components such that the prescribed number n equals two.

6. The process of claim 3, wherein the different types of resources are central processing unit resources for two different software components and network bandwidth resources between the two software components such that the prescribed number n equals three.

7. The process of claim 3, wherein the different types of resources are central processing unit resources for more than two different software components and network bandwidth resources between the more than two different software components such that the prescribed number n is greater than three.

8. The process of claim 3, wherein the process action of computing the elements of an initial AHF resource usage pattern matrix $\tilde{R}$ from the data points comprises actions of:
identifying any data points which are corrupted, wherein a corrupted data point comprises either,
(a) an aggregate ASR count which is anomalously high in comparison to the other data points,
(b) an aggregate AHF resource usage measurement for one or more of the n different types of resources which is anomalously high in comparison to the other data points, or
both (a) and (b);
removing the corrupted data points, resulting in a set of uncorrupted data points; and
computing the elements of $\tilde{R}$ from the set of uncorrupted data points.

9. The process of claim 8, wherein the process action of computing the elements of an initial AHF resource usage pattern matrix $\tilde{R}$ from the data points further comprises an action of randomizing the order of the data points in the set of uncorrupted data points before the elements of $\tilde{R}$ are computed.

10. The process of claim 1, wherein the process action of computing an estimate for the number m of different categories of ASRs from $\tilde{R}$ comprises actions of:
determining the rank of $\tilde{R}$; and
setting m equal to the rank of $\tilde{R}$.

11. The process of claim 10, wherein a singular value decomposition method is employed to determine the rank of $\tilde{R}$.

12. The process of claim 1, wherein the BSS procedure comprises a fast independent component analysis (FastICA) algorithm.

13. The process of claim 12, wherein the process action of computing the elements of an AHF resource usage signature matrix A and an ASR categorization matrix X from m and $\tilde{R}$ comprises actions of:
computing the elements $\tilde{a}_{ij}$ of an initial AHF resource usage signature matrix $\tilde{A}$;
computing the elements of A by dividing all the elements $\tilde{a}_{ij}$ in the j-th column of $\tilde{A}$ by $\tilde{a}_{1j}$ for all the columns of $\tilde{A}$;
computing the equation $X=A^{-1}\tilde{R}$ in order to compute the elements of X; and
whenever m is less than n,
removing from X the particular (n−m) row(s) of X whose element values are significantly smaller than the element values in the other rows of X, and
removing from A the particular (n−m) column(s) of A which correspond to the row(s) that were removed from X.

14. The process of claim 12, wherein a total tolerable error of $10^{-10}$ is specified for the FastICA algorithm.

15. The process of claim 1, wherein the BSS procedure comprises either a non-negative matrix factorization algorithm, a non-negative independent component analysis algorithm, or a correlated component analysis algorithm.

16. The process of claim 1, further comprising an action of inputting the elements of A and X to a performance model for the AHF.

17. The process of claim 1, further comprising actions of:
predicting the elements of a future ASR categorization matrix X' from the elements of X; and
predicting the elements of a future AHF resource usage pattern matrix R' by computing the equation R'=AX'+C, wherein C is a matrix of prescribed constants.

18. A computer-implemented process for automatically differentiating and categorizing application service requests (ASRs) received by an application hosting framework (AHF) and predicting AHF resource usage patterns associated with the ASRs, comprising:
using a computing device to perform the following process actions:
(a) successively extracting a prescribed number of resource usage data points from the AHF, wherein each data point comprises an aggregate measurement of AHF resource usage for each of a prescribed number n of different types of resources in the AHF;
(b) computing the elements of an initial AHF resource usage pattern matrix $\tilde{R}$ from the data points;
(c) setting a variable m equal to one, wherein m is an estimate for the number of different categories of ASRs;
(d) computing the elements of an AHF resource usage signature matrix $A_m$ and an ASR categorization matrix $X_m$ from m and $\tilde{R}$ using a blind source separation (BSS) procedure;
(e) whenever m equals n, equating the elements of a final AHF resource usage signature matrix A to the elements of $A_m$, equating the elements of a final ASR categorization matrix X to the elements of $X_m$, and stopping the process;
(f) incrementing m by one;
(g) computing the elements of a revised signature matrix $A_m$ and a revised categorization matrix $X_m$ from m and $\tilde{R}$ using the BSS procedure;
(h) whenever the difference between the revised $X_m$ and the previously computed $X_{(m-1)}$ is greater than a prescribed degree, and m is not equal to n, repeating (f) and (g); and
(i) whenever m equals n or the difference between the revised $X_m$ and the previously computed $X_{(m-1)}$ is not greater than the prescribed degree, equating the elements of a final AHF resource usage signature matrix A to the elements of the revised $A_m$, and equating the elements of a final ASR categorization matrix X to the elements of the revised $X_m$.

19. The process of claim 18, wherein the process action of computing the elements of an AHF resource usage signature matrix $A_m$ and an ASR categorization matrix $X_m$ from m and $\tilde{R}$, and the process action of computing the elements of a revised signature matrix $A_m$ and a revised categorization matrix $X_m$ from m and $\tilde{R}$ both comprise actions of:
   computing the elements $\tilde{a}_{mij}$ of an initial AHF resource usage signature matrix $\tilde{A}_m$;
   computing the elements of $A_m$ by dividing all the elements $\tilde{a}_{mij}$ in the j-th column of $\tilde{A}_m$ by $\tilde{a}_{mij}$ for all the columns of $\tilde{A}_m$;
   computing the equation $X_m = A_m^{-1}\tilde{R}$ in order to compute the elements of $X_m$; and
   whenever m is less than n,
      removing from $X_m$ the particular (n−m) row(s) of $X_m$ whose element values are significantly smaller than the element values in the other rows of $X_m$, and
      removing from $A_m$ the particular (n−m) column(s) of $A_m$ which correspond to the row(s) that were removed from $X_m$.

20. A computer-implemented process for automatically differentiating and categorizing application service requests (ASRs) received by an application hosting framework (AHF) and predicting AHF resource usage patterns associated with the ASRs, comprising:
   using a computing device to perform the following process actions:
      successively extracting a prescribed number of resource usage data points from the AHF, wherein each data point comprises,
         an aggregate count of the number of ASRs received by the AHF during a prescribed duration time window, and
         an aggregate measurement of AHF resource usage for each of a prescribed number n of different types of resources in the AHF during the time window;
      identifying any data points which are corrupted;
      removing the corrupted data points, resulting in a set of uncorrupted data points;
      randomizing the order of the data points in the set of uncorrupted data points, resulting in a set of randomized uncorrupted data points;
      computing the elements of an initial AHF resource usage pattern matrix $\tilde{R}$ from the set of randomized uncorrupted data points;
      computing an estimate for the number m of different categories of ASRs from $\tilde{R}$ using a fast independent component analysis (FastICA) algorithm, wherein the ASRs in each category have similar resource usage patterns, said computation comprising actions of,
         determining the rank of $\tilde{R}$, and
         setting m equal to the rank of $\tilde{R}$;
      using the FastICA algorithm to,
         compute the elements $\tilde{a}_{ij}$ of an initial AHF resource usage signature matrix $\tilde{A}$,
         compute the elements of a revised AHF resource usage signature matrix A by dividing all the elements $\tilde{a}_{ij}$ in the j-th column of $\tilde{A}$ by $\tilde{a}_{1j}$ for all the columns of $\tilde{A}$, and
         compute the equation $X = A^{-1}\tilde{R}$ in order to compute the elements of an ASR categorization matrix X; and
      whenever m is less than n,
         removing from X the particular (n−m) row(s) of X whose element values are significantly smaller than the element values in the other rows of X, and
         removing from A the particular (n−m) column(s) of A which correspond to the row(s) that were removed from X.

* * * * *